United States Patent [19]

Ogawa et al.

[11] Patent Number: 5,115,065

[45] Date of Patent: May 19, 1992

[54] POLYMERIC PAPERMAKING ADDITIVE

[75] Inventors: Masatomi Ogawa; Mitsuhiro Murata, both of Ichihara, Japan

[73] Assignee: DIC-Hercules Chemicals, Inc., Tokyo, Japan

[21] Appl. No.: 169,114

[22] Filed: Mar. 9, 1988

Related U.S. Application Data

[63] Continuation of Ser. No. 914,277, Oct. 2, 1986, abandoned.

[30] Foreign Application Priority Data

Oct. 4, 1985 [JP]  Japan .................. 60-220268

[51] Int. Cl.$^5$ ............................. L08F 20/58
[52] U.S. Cl. .................. 526/304; 162/157.4
[58] Field of Search ............................ 526/304

[56] References Cited

U.S. PATENT DOCUMENTS 3,323,979  6/1967  Foster et al. .................. 526/307
3,666,810  5/1972  Hoke .................. 526/307

FOREIGN PATENT DOCUMENTS 0099694  1/1984  European Pat. Off. .

*Primary Examiner*—Thurman K. Page
*Assistant Examiner*—Peter F. Kulkosky
*Attorney, Agent, or Firm*—Sherman and Shalloway

[57] ABSTRACT

A papermaking additive useful for papermaking in a neutral to alkaline pH region, which comprises as an active component a water-soluble copolymer comprising as constituent monomers (a) 0.1 to 20 mole % of a specific bisquaternary ammonium (meth)acrylamide, (b) 0 to 20 mole % of a specific acrylamide or acrylic ester derivative such as an aminoalkyl (meth)acrylamide or an aminoalkyl (meth)acrylate, or a salt thereof, (c) 50 to 99.9 mole % of acrylamide and/or methacrylamide, and (d) 0 to 10 mole % of an alpha,beta-unsaturated carboxylic acid and/or a salt thereof. The additive increases paper strength and filler retention and size retention.

4 Claims, No Drawings

POLYMERIC PAPERMAKING ADDITIVE

This application is a continuation of application Ser. No. 914,277 filed Oct. 2, 1986, now abandoned.

BACKGROUND OF THE INVENTION

1. Field of the Invention

This invention relates to a papermaking additive which comprises a specific water-soluble copolymer composed mainly of acrylamide and/or methacrylamide and which can exhibit an excellent effect of increasing paper strength and of retaining a size and a filler in papermaking in a neutral to alkaline pH region.

2. Description of the Prior Art

The acid sheet forming process using alum has previously been the mainstay of the papermaking industry. However, in the acid sheet forming process, the resulting paper is susceptible to degradation and the paper machines undergo corrosion. Moreover, as the papermaking process has recently been carried out in a closed system as a measure of saving energy and controlling environmental pollution, there has been a move toward the employment of a papermaking system with a reduced amount of alum or an alum-free, namely towards a neutral or an alkaline papermaking system. With this move toward higher pH papermaking, it has been desired to develop a papermaking additive which can exhibit a superior effect of retaining a filler and a size and increasing paper strength in papermaking carried out in a neutral to alkaline pH region.

Papermaking additives comprising polymers composed mainly of acrylamide units have been reported so far. The Hofmann rearrangement and Mannich reaction are known as the method of ionizing acrylamide-type polymers. The Hofmann rearrangement product shows a relatively good effect but still has unsatisfactory stability. The Mannich reaction product, when used in papermaking in a neutral to alkaline pH region, decreases in cationic character and does not exhibit a sufficient effect.

The present inventors previously invented a paper strength increasing agent comprising as an active component a terpolymer composed of a water-soluble cationic monomer, an alpha,beta-unsaturated dicarboxylic acid and acrylamide, and applied it for patent (Japanese Laid-Open Patent Publication No. 94697/1985). However, when an acrylic acid ester such as commercially available dimethylaminoethyl methacrylate is used as the water-soluble cationic monomer, the resulting terpolymer is liable to decrease in cationic character or is susceptible to hydrolysis in papermaking system in a neutral to alkaline pH region.

SUMMARY OF THE INVENTION

It is an object of this invention to provide a papermaking additive which exhibits an excellent effect of increasing paper strength and retaining a filler and a size in papermaking in neutral to alkaline pH region.

Investigations of the present inventors to develop a papermaking additive which can meet the above object have now led to the discovery that a water-soluble copolymer obtained by copolymerizing a specific bisquaternary ammonium (meth)acrylamide and acrylamide or methacrylamide optionally with an aminoalkyl (meth)acrylamide or an aminoalkyl (meth)acrylate or a salt thereof and an alpha,beta-unsaturated carboxylic acid and/or a salt thereof shows very superior performance as such a papermaking additive.

According to this invention, there is provided a papermaking additive useful for papermaking in a neutral to alkaline pH region, which comprises as an active component a water-soluble copolymer comprising as constituent monomers (a) 0.1 to 20 mole % of a bisquaternary ammonium (meth)acrylamide represented by the general formula

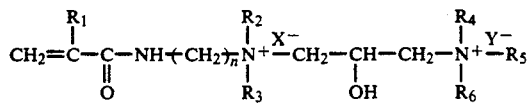

wherein n represents 2, 3 or 4, $R_1$ represents a hydrogen atom or a methyl group, $R_2$ to $R_6$ are identical or different and each represents an alkyl group of 1 to 3 carbon atoms, and $X^-$ and $Y^-$ are identical or different and each represents an anion, (b) 0 to 20 mole% of an acrylamide or acrylic ester derivative represented by the general formula

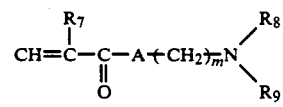

wherein m represents 2, 3 or 4, $R_7$ represents a hydrogen atom or a methyl group, $R_8$ and $R_9$ are identical or different and each represents an alkyl group of 1 to 3 carbon atoms, and A represents NH or an oxygen atom, and/or a salt thereof, (c) 50 to 99.9 mole% of acrylamide and/or methacrylamide, and (d) 0 to 10 mole% of an alpha,beta-unsaturated carboxylic acid and/or a salt thereof.

Preferably, the total proportion of components (a) and (b) is 0.5 to 20 mole%, and the ratio of the proportion of component (a) to that of component (b) is from 2:8 to 8:2.

DETAILED DESCRIPTION OF THE INVENTION

Component (a) can be obtained by reacting an acrylamide derivative having a tertiary amino group, such as dimethylaminopropyl acrylamide, with 1-chloro-2-hydroxypropyl trimethyl ammonium chloride.

Preferred specific examples of component (b) include (meth)acrylic esters such as dimethylaminoethyl acrylate, dimethylaminopropyl methacrylate, diethylaminoethyl acrylate and diethylaminopropyl methacrylate, and (meth)acrylamide derivatives such as dimethylaminoethyl acrylamide, dimethylaminopropyl acrylamide, diethylaminoethyl methacrylamide and diethylaminobutyl methacrylamide. The (meth)acrylamide derivatives are preferable to the (meth)acrylic esters because the former have resistance to hydrolysis. Examples of component (d) are alpha,betaunsaturated carboxylic acids such as acrylic acid, methacrylic acid, itaconic acid and maleic acid, and salts thereof such as the sodium, potassium and ammonium salts. Of these, alpha,beta-unsaturated dicarboxylic acids and/or their salts are preferred, and itaconic acid and/or its salts are especially preferred.

Besides these components, a nonionic monomer copolymerizable with these components, such as styrene, vinyl acetate, acrylonitrile, ethyl acrylate and methyl methacrylate, may be used further in an amount which does not impair the water-solubility of the resulting copolymer, and this feature is also within the scope of this invention.

Component (a) has two cationic quaternary ammonium groups per molecule. Because of the high charge density of component (a), the copolymer of component (a) and component (c) (i.e., acrylamide or methacrylamide) has high cationic character even if the proportion of component (a) copolymerized is small. Since the use of the cationic monomer (a) makes it possible to impart sufficient cationic character to the copolymer without so much decreasing the amount of the amide groups which contribute to paper strength increase, the resulting copolymer has an excellent paper strength increasing effect. The high charge density of component (a) is also considered to bring about the advantage of improving filler and size retention.

The combined use of component (b) with component (a) in this invention leads to higher performance. The cause of the synergistic effect of components (a) and (b) is not entirely clear, but it is presumed that the combined use of component (b) enhances the copolymerizability of the components (a), (b), (c) and (d) with each other and results in moderate dispersion of the electric charge. An especially good result is obtained when the ratio of the proportion of component (a) to that of component (b) is from 2:8 to 8:2.

The copolymer in accordance with this invention comprises 0.1 to 20 mole% of component (a), 0 to 20 mole% of component (b), 50 to 99.9 mole% of component (c) and 0 to 10 mole% of component (d) as constituent monomers. Preferably, the total proportion of components (a) and (b) is 0.5 to 20 mole%, and the ratio of component (a) to component (b) is within the aforesaid range.

If the proportion of these cationic monomers in the copolymer is too large, paper strength tends to decrease although filler and size retention increases. Furthermore, excessive flocculation is observed and the formation of paper tends to be worse. On the other hand, if the proportion of the cationic monomers in the copolymer is too small, filler and size retention is reduced.

Preferably, the copolymer of this invention has a viscosity (Brookfield viscosity at 25° C.), determined for its 15% by weight aqueous solution, of usually 300 to 100,000 cps, especially 800 to 30,000 cps. If its viscosity is too low (low molecular weight), the copolymer has an insufficient paper strength increasing effect and a filler and size retaining effect. If its viscosity is too high (high molecular weight), the copolymer has an excellent filler and size retaining effect, but since excessive flocculation occurs, the formation of the resulting paper tends to be worse.

The papermaking additive of this invention can be synthesized in accordance with conventional methods. One such method comprises adding a conventional chain transfer agent such as isopropyl alcohol, allyl alcohol, sodium allylsulfonate or sodium hypophosphite to an aqueous solution containing predetermined amounts of components (a), (b), (c) and (d) and optionally a nonionic monomer, adding a radical polymerization initiator such as ammonium persulfate, potassium persulfate or sodium persulfate or a redox polymerization initiator comprising a combination of such a persulfate with a reducing agent such as sodium hydrogen sulfite, and while adjusting the monomer concentration to 5 to 35% by weight and the pH of the solution at 3 to 6, stirring the solution at 35 to 95° C. for 1 to 10 hours with stirring in an atmosphere of an inert gas.

The following Example, Comparative Example, and Application Examples illustrate the present invention more specifically. Unless otherwise specified, all percentages are by weight.

EXAMPLE

A four-necked flask equipped with a stirrer, a thermometer, a reflux condenser and a nitrogen gas introducing tube was charged with 756.0 g of deionized water, 267.0 g of a 50% aqueous solution of acrylamide, 19.7 g of a 70% aqueous solution of 2-hydroxy-N,N,N,N',N'-pentamethyl-N -{3[(1-oxo-2-propenyl)amino] propyl}-1,3-propanediaminium dichloride, 9.4 g of dimethylaminopropyl acrylamide, 2.6 g of itaconic acid and 6.9 g of a 5% aqueous solution of sodium hypophosphite. The pH of the aqueous solution in the flask was adjusted to 4.0 with 15% sulfuric acid. The solution was heated to 60° C. while nitrogen gas was introduced into the flask. Then, 4.6 g of a 5% aqueous solution of ammonium persulfate was added, and the polymerization was started. The reaction mixture was then maintained at 75° C. for 3 hours to complete the polymerization. The resulting copolymer (designated as copolymer A) was a clear aqueous solution having a total solids content of 15.1%, a pH of 4.3 and a Brookfield viscosity at 25° C. of 6,800 cps.

Aqueous solutions of copolymers B to K were prepared in the same way as in the production of copolymer A above in accordance with the recipes of the constituent monomer components shown in Table 1. To obtain the copolymer aqueous solutions having equivalent viscosities, the amount of the chain transfer agent was properly changed.

COMPARATIVE EXAMPLE

Aqueous solutions of copolymers a to g were prepared in the same way as in Example 1 in accordance with the recipes of the constituent monomer components shown in Table 2.

The properties of the aqueous solutions of copolymers obtained in Example and Comparative Example are summarized in Tables 1 and 2.

TABLE 1

| Co-polymer | | Monomer composition of the copolymer (mole %) | | | | Properties | |
|---|---|---|---|---|---|---|---|
| | | (a) | (b) | (c) | (d) | Total solids (%) | Viscosity 25° C. (cps) |
| Example | A | $a_1$ (2) | $b_1$ (3) | 94 | $d_1$ (1) | 15.1 | 6800 |
| | B | $a_1$ (3.5) | $b_1$ (1.5) | 94 | $d_1$ (1) | 15.2 | 6600 |
| | C | $a_1$ (5) | — | 94 | $d_1$ (1) | 15.1 | 6250 |
| | D | $a_1$ (3.5) | $b_1$ (1.5) | 95 | — | 15.3 | 7200 |
| | E | $a_1$ (5) | — | 95 | — | 15.1 | 6400 |
| | F | $a_1$ (0.5) | $b_1$ (0.5) | 98 | $d_1$ (1) | 15.4 | 8300 |
| | G | $a_1$ (10) | $b_1$ (10) | 75 | $d_1$ (5) | 15.2 | 6000 |
| | H | $a_1$ (20) | — | 75 | $d_1$ (5) | 15.2 | 6200 |
| | I | $a_1$ (3.5) | $b_2$ (1.5) | 94 | $d_1$ (1) | 15.0 | 6400 |
| | J | $a_1$ (3.5) | $b_3$ (1.5) | 94 | $d_1$ (1) | 15.3 | 7800 |
| | K | $a_1$ (3.5) | $b_1$ (1.5) | 94 | $d_2$ (1) | 15.3 | 7250 |
| | L | $a_1$ (3.5) | $b_1$ (1.5) | 94 | $d_3$ (1) | 15.1 | 6600 |
| | M | $a_1$ (3.5) | $b_1$ (1.5) | 94 | $d_4$ (1) | 15.2 | 7300 |
| | N | $a_2$ (3.5) | $b_1$ (1.5) | 94 | $d_1$ (1) | 15.4 | 8000 |

TABLE 2

| Copolymer | | Monomer composition of the copolymer (mole %) | | | | Properties | |
|---|---|---|---|---|---|---|---|
| | | (a) | (b) | (c) | (d) | Total solids (%) | Viscosity 25° C. (cps) |
| Comparative Example | a | — | $b_1$ (5) | 94 | $d_1$ (1) | 15.2 | 6450 |
| | b | — | $b_1$ (5) | 95 | — | 15.2 | 7200 |
| | c | — | $b_1$ (1) | 98 | $d_1$ (1) | 15.0 | 6800 |
| | d | — | $b_1$ (20) | 75 | $d_1$ (5) | 15.4 | 8700 |
| | e | — | $b_2$ (5) | 94 | $d_1$ (1) | 15.3 | 6800 |
| | f | — | $b_3$ (5) | 94 | $d_1$ (1) | 15.1 | 6250 |
| | g | — | $b_1$ (5) | 94 | $d_2$ (1) | 15.1 | 6400 |
| | h | — | $b_1$ (5) | 94 | $d_3$ (1) | 15.0 | 6700 |
| | i | — | $b_1$ (5) | 94 | $d_4$ (1) | 15.0 | 6650 |

The components $a_1$, $a_2$, $b_1$, $b_2$, $b_3$, c, $d_1$, $d_2$, $d_3$ and $d_4$ in Tables 1 and 2 were as follows:

$a_1$: 2-hydroxy-N,N,N,N'-pentamethyl-N'-{3-[(1-oxo-2-propenyl)amino]propyl}-1,,3-pr opanediaminium dichloride

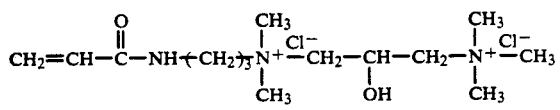

$a_2$: 2-dydroxy-N,N,N,N',N'-pentamethyl-N'-{3-[(1-oxo-2-methyl-2-propenyl)amino]propyl}-1,3-propanediaminium dichloride

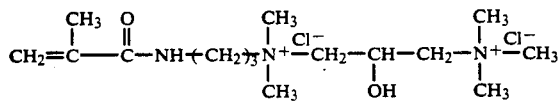

$b_1$: dimethylaminopropyl acrylamide
$b_2$: dimethylaminoethyl methacrylamide
$b_3$: dimethylaminopropyl acrylate
c: acrylamide
$d_1$: itaconic acid
$d_2$: maleic acid
$d_3$: acrylic acid
$d_4$: methacrylic acid

APPLICATION EXAMPLE 1

In order to determine the effect of the papermaking additives of this invention in calcium carbonate filled paper, a 2.5% aqueous dispersion of pulp [bleached kraft pulp: hard wood/soft wood=8/2, Canadian standard freeness (CSF) 405 ml] was mixed with 20%, based on the pulp, of calcium carbonate, 0.4%, based on the pulp, of each of the copolymers obtained in Example and Comparative Example, and 0.1%, based on the pulp, of Hercon W (an alkylketene dimer sizing agent made by DIC-HERCULES CHEMICALS, INC.). The pulp slurry was then diluted to 0.25%, and formed into a sheet by the Noble & Wood laboratory hand sheet machine at a pH of 8.0, and then dried at 100° C. for 90 seconds by a drum dryer to give a hand sheet having a basis weight of 70±2 g/m². The sheet was conditioned at 20° C. and 65% RH for 24 hours, and used in various measurements. The percentages of the above chemicals added are weight percents of solids based on the absolute dry weight of the pulp. The results of the measurements are shown in Table 3.

The results in Table 3 demonstrate that the copolymers of this invention comprising the bisquaternary ammonium acrylamide used as the papermaking additive are better than the other copolymers in regard to paper strength, filler retention and sizing degree.

It is also seen from Table 3 that the copolymer obtained by using a combination of components (a) and (b) as the cationic monomer shows an excellent effect.

TABLE 3

| Copolymer | | Note 1) T. M. (%) | Filler content (%) | Breaking length (km) | Internal bond strength (kgf cm) | Stöckigt sizing degree (sec.) |
|---|---|---|---|---|---|---|
| Example | A | 44.1 | 10.3 | 4.26 | 1.10 | 28.1 |
| | B | 46.1 | 10.8 | 4.21 | 1.08 | 30.2 |
| | C | 45.9 | 10.5 | 4.04 | 0.98 | 36.1 |
| | D | 43.8 | 9.2 | 4.06 | 0.98 | 33.4 |
| | E | 44.2 | 9.4 | 4.04 | 0.96 | 35.8 |
| | F | 36.2 | 7.6 | 4.10 | 1.00 | 18.7 |
| | G | 47.2 | 11.2 | 3.90 | 0.82 | 46.2 |
| | H | 49.6 | 11.4 | 3.88 | 0.79 | 50.8 |
| Comparative | a | 44.8 | 10.0 | 4.01 | 0.98 | 18.2 |
| | b | 32.9 | 8.0 | 4.02 | 0.80 | 5.4 |
| | d | 27.8 | 6.2 | 3.92 | 0.72 | 8.0 |
| | d | 45.1 | 10.9 | 3.68 | 0.63 | 20.9 |
| Example | I | 45.1 | 10.5 | 4.12 | 0.99 | 28.3 |
| | J | 43.8 | 10.1 | 4.03 | 0.98 | 27.4 |
| | K | 45.3 | 10.4 | 4.15 | 0.99 | 29.3 |
| | L | 43.9 | 10.2 | 3.98 | 0.96 | 28.1 |
| | M | 44.1 | 10.0 | 4.01 | 0.94 | 26.4 |
| | N | 45.8 | 10.6 | 4.18 | 1.06 | 30.1 |
| Comparative Example | e | 43.2 | 9.6 | 3.99 | 0.98 | 17.6 |
| | f | 40.0 | 9.0 | 3.90 | 0.91 | 15.4 |
| | g | 43.4 | 10.0 | 4.00 | 0.96 | 16.2 |
| | h | 41.4 | 9.2 | 3.88 | 0.94 | 15.1 |
| | i | 40.8 | 9.0 | 3.91 | 0.95 | 14.9 |

The measurements shown in Table 3 were carried out by the following methods.

Filler content

The ash content was measured in accordance with JIS P-8128. The amount of CaO was then multiplied by 1.78 to convert it into the amount of $CaCo_3$.

Breaking length

JIS P-8114.

Internal bond strength

Measured by using an internal bond tester (made by Nihon Rigaku Kogyo K. K.). Bonding conditions: 5 kg/inch² and 1 minute.

Stöckigt sizing degree

JIS P-8122

Note 1) T. M. (%)

By using the same device as the modified Hercules dynamic drainage tester as described in Papermakers Conference (page 171, 1985) (having such a structure that a pulp slurry is poured into a jar having a diameter of about 7.5 cm and with agitation, air is sent from the lower portion so as not form a mat, and filtration of the slurry is effected as soon as the agitation and the sending of air are stopped), 300 ml of the pulp slurry was poured into the jar, and 70 ml of the filtrate was taken. The transmittance at 620 nm (T. M. %) of this filtrate was measured. T. M. (%) is used as a parameter of the first pass retention. Specifically, the higher the T. M. %, the clearer the filtrate. This shows higher ratios of the filler and fine fibers which were effectively utilized (higher filler retention).

APPLICATION EXAMPLE 2

In order to examine the properties of the papermaking additive of this invention under papermaking conditions in a nearly neutral pH region using a small amount of alum, a 2.5% aqueous dispersion of pulp (waste corrugated board, Canadian standard freeness 395 ml) was mixed with 0.5%, based on the pump, of alum, 0.4%, based on the pulp of the copolymer, and 0.6%, based on the pump, of a sizing agent (alkenylsuccinic anhydride) successively. The pulp slurry was diluted to 0.25%. The DDT (note 2 below) of the pulp slurry was measured to evaluate its freeness. Also, the pump slurry was formed into a sheet by the Noble & Wood laboratory hand sheet machine at a pH of 6.5, and dried by a drum dryer at 110° C. for 90 seconds to give a hand sheet (I) having a basis weight of 80±2 g/m² and a hand sheet (II) having a basis weight of 163±2 g/m². The resulting hand sheets were conditioned at 20° C. and 65% RH for 24 hours. The burst factor (JIS P-8112) and Stöckigt sizing degree (JIS P-8122) of the hand sheet (I) were measured, and the ring crush factor (JIS P-8126) of the hand sheet (II) was measured. The results are shown in Table 4.

The above percentages of the chemicals added are weight percents of solids based on the absolute dry weight of pulp.

It is seen from Table 4 that the papermaking additive of this invention shows an excellent effect of paper strength increase and size retention also in a papermaking system containing a small amount of alum.

TABLE 4

| Copolymer | | DDT 200 ml (sec.) | Burst factor | Ring crush factor | Stöckigt sizing degree (sec.) |
|---|---|---|---|---|---|
| Example | A | 28.2 | 2.98 | 19.6 | 26.8 |
| | B | 26.3 | 3.00 | 19.8 | 29.0 |
| | C | 24.8 | 2.91 | 19.2 | 30.6 |
| | F | 33.6 | 2.77 | 18.0 | 20.1 |
| | I | 27.8 | 2.89 | 19.0 | 25.9 |
| | J | 28.2 | 2.86 | 18.9 | 26.5 |
| Comparative Example | a | 33.9 | 2.88 | 18.9 | 14.0 |
| | c | 44.2 | 2.68 | 17.2 | 8.3 |
| | e | 33.7 | 2.69 | 17.9 | 14.2 |
| | f | 40.2 | 2.60 | 16.8 | 10.9 |

(Note 2): DDT

Using the same apparatus as the "Dynamic Drainage Jar" described at page 46 of TAPPI Journal, vol. 56, No. 10 (1973), a pump slurry (800 ml) was poured into a jar having a diameter of about 7.5 cm. With stirring at 800 rpm, a cock at the lower portion was opened to filter the slurry through a 100-mesh wire gauze. The time which elapsed until the amount of the filtration became 200 ml was measured. DDT can be used to evaluate freeness.

What is claimed is:

1. A papermaking additive useful for papermaking in a neutral to alkaline pH region, which comprises as an active component a water-soluble copolymer comprising as constituent monomers
    (a) 0.1 to 20 mole % of a bisquaternary ammonium (meth)acrylamide represented by the general formula

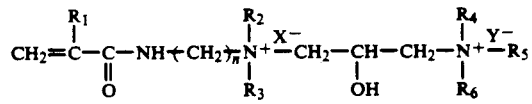

wherein n represents 2, 3 or 4, $R_1$ represents a hydrogen atom or a methyl group, $R_2$ to $R_6$ are identical or different and each represents an alkyl group of 1 to 3 carbon atoms, and $X^{31}$ and $Y^{31}$ are identical or different and each represents an anion, (b) 0.5 to 2.5 mole % of an acrylamide or acrylic ester derivative represented by the general formula

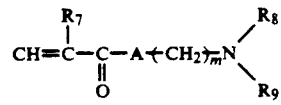

wherein m represents 2, 3 or 4, $R_7$ represents a hydrogen atom or a methyl group, $R_8$ or $R_9$ are identical or different and each represents an alkyl group of 1 to 3 carbon atoms, and A represents NH or an oxygen atom, its salt or mixture thereof, (c) 50 to 99.9 mole % of acrylamide, methacrylamide or mixture thereof, and (d) 1 to 10 mole % of an alpha,beta-unsaturated dicarboxylic acid, its salt or mixture thereof.

2. The papermaking additive of claim 1 wherein component (d) is itaconic acid or maleic acid.

3. The papermaking additive of claim 1 wherein the copolymer additionally comprises a nonionic monomer selected from the group consisting of styrene, vinyl acetate, acrylonitrile, ethyl acrylate and methyl methacrylate in an amount which does not impair the water-solubility of the resulting copolymer.

4. The papermaking additive of claim 1 wherein component (b) is an aminoalkyl(meth)acrylamide.

* * * * *